(12) United States Patent
Moscatello et al.

(10) Patent No.: US 12,430,238 B2
(45) Date of Patent: Sep. 30, 2025

(54) SYSTEM FOR AGGREGATING PROGRAM ANALYSIS TOOLS

(71) Applicant: Nightwing Group, LLC, Dulles, VA (US)

(72) Inventors: Vincent A. Moscatello, Austin, TX (US); William G. Pence, Clearwater, FL (US); Cody J. Campbell, Tampa, FL (US)

(73) Assignee: Nightwing Group, LLC, New York, NY (US)

( * ) Notice: Subject to any disclaimer, the term of this patent is extended or adjusted under 35 U.S.C. 154(b) by 181 days.

(21) Appl. No.: 18/462,825

(22) Filed: Sep. 7, 2023

(65) Prior Publication Data

US 2024/0086309 A1    Mar. 14, 2024

Related U.S. Application Data

(60) Provisional application No. 63/404,783, filed on Sep. 8, 2022.

(51) Int. Cl.
*G06F 11/3698* (2025.01)
*G06F 3/0482* (2013.01)
*G06F 8/74* (2018.01)

(52) U.S. Cl.
CPC ........ *G06F 11/3698* (2025.01); *G06F 3/0482* (2013.01); *G06F 8/74* (2013.01)

(58) Field of Classification Search
CPC ....... G06F 11/3698; G06F 3/0482; G06F 8/74
See application file for complete search history.

(56) References Cited

U.S. PATENT DOCUMENTS

| | | | |
|---|---|---|---|
| 2003/0023953 A1* | 1/2003 | Lucassen | G06F 8/38 717/106 |
| 2018/0341477 A1* | 11/2018 | Kulkarni | G06F 9/541 |
| 2022/0181012 A1* | 6/2022 | Skelton | G16H 20/30 |

OTHER PUBLICATIONS

Balci et al., "Malware Reverse Engineering Handbook," (2020). (Year: 2020).*

* cited by examiner

*Primary Examiner* — Jay A Morrison
(74) *Attorney, Agent, or Firm* — Cowan, Liebowitz & Latman, P.C.; Mark Montague

(57) ABSTRACT

A system for aggregating program analysis tools displays a list of program analysis tool modules on a first computer user interface, and receives from a user a selection of a first program analysis tool. The system then renders a second computer user interface for the first program analysis tool, and receives input from the user identifying an action to be performed in a reverse engineering framework. The system then transmits.

20 Claims, 8 Drawing Sheets

SELECT A PROGRAM ANALYSIS TOOL:

A.   PROGRAM ANALYSIS TOOL 1

B.   PROGRAM ANALYSIS TOOL 2

C.   PROGRAM ANALYSIS TOOL 3

*Fig.2*

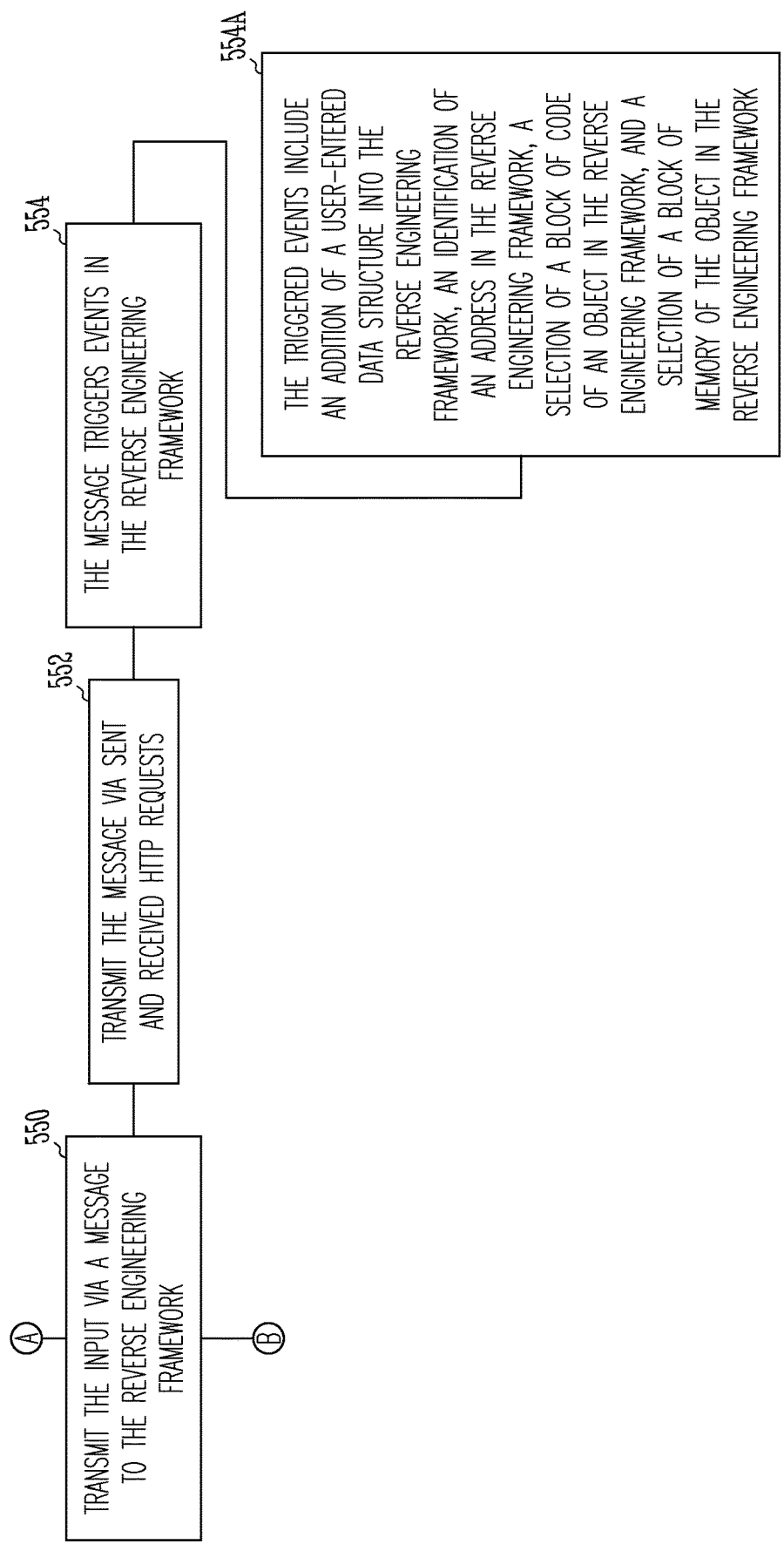

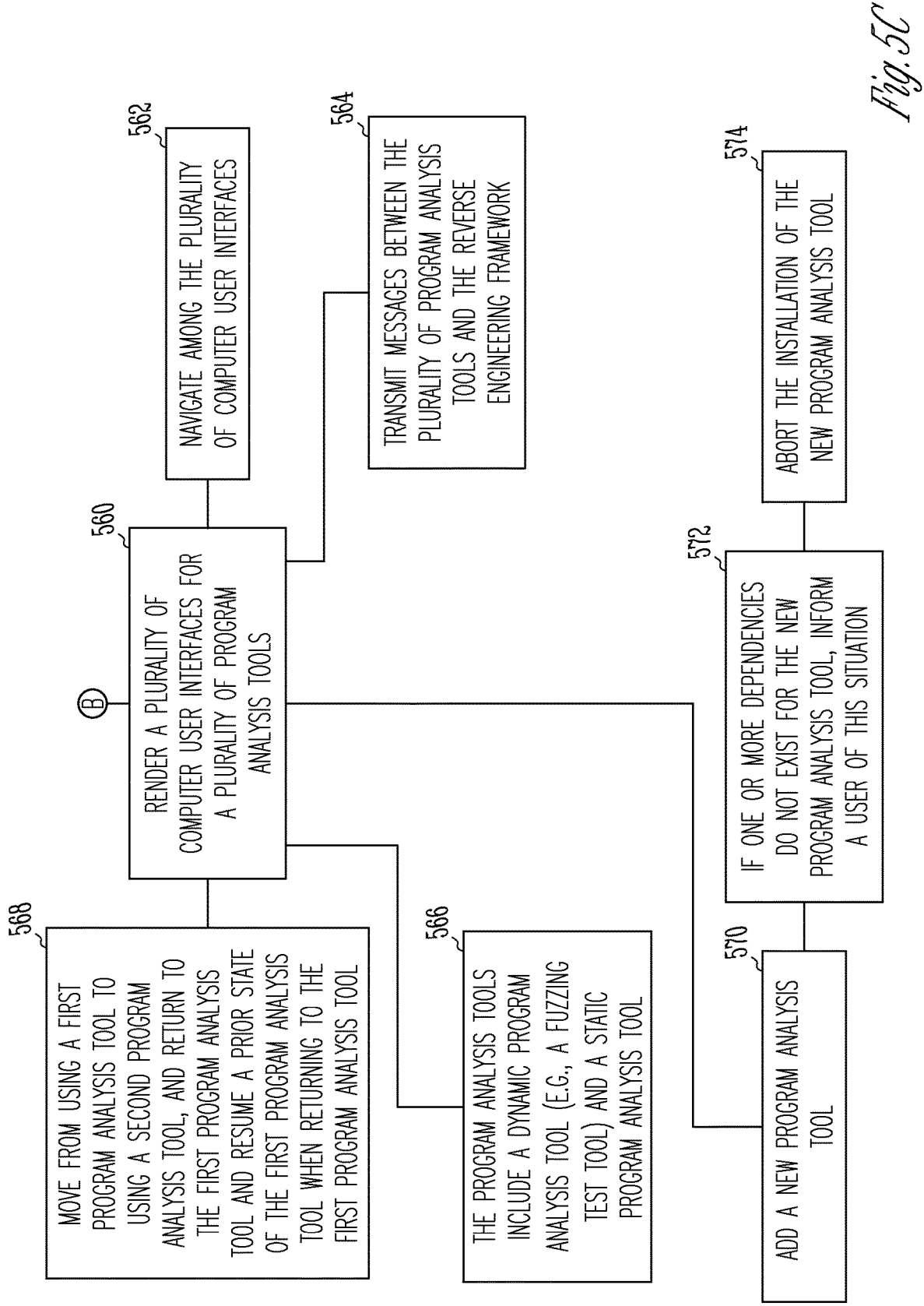

SYSTEM FOR AGGREGATING PROGRAM ANALYSIS TOOLS

CLAIM OF PRIORITY

This patent application claims the benefit of U.S. Provisional Patent Application No. 63/404,783 filed Sep. 8, 2022, entitled "SYSTEM FOR AGGREGATING PROGRAM ANALYSIS TOOLS", which is incorporated by reference herein in its entirety.

TECHNICAL FIELD

Embodiments described herein generally relate to a system for aggregating program analysis tools in a reverse engineering framework.

BACKGROUND

When analyzing software systems, reverse engineers typically pair a reverse engineering framework like IDA (Interactive Disassembler) or Ghidra with standalone program analysis tools. However, aggregating data from standalone program analysis tools and inputting the tools' results into the reverse engineering framework becomes tedious and intractable because the underlying language and operation of these tools are often disparate from the reverse engineering frameworks with which they are paired. For example, some inputs cannot be natively input into a reverse engineering framework like IDA or Ghidra. Because of the differences in programming languages and interfaces, incompatibilities exist between program analysis tools and plugins that can be designed natively for program analysis tools. Existing Ghidra plugins may provide integration of one tool into Ghidra, but these solutions are often tightly coupled to the tool and do not allow for multiple tools or new modules to be added. Consequently, with such a large variety of program analysis tools available, managing reverse engineering tool sets quickly becomes difficult.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

FIG. 2 illustrates an example of a navigational user interface for listing program analysis tool modules.

FIGS. 5A, 5B and 5C are a block diagram illustrating operations and features of a system for aggregating program analysis tools.

DETAILED DESCRIPTION

An embodiment provides a module core that allows for multiple tools to be integrated and used at once in connection with a reverse engineering framework, to navigate between program analysis tools and a reverse engineering framework, to organize the inputs and outputs of program analysis tools, and to add more tools as desired. It includes a centralized user interface for operating and displaying program analysis tools from reverse engineering frameworks. The user interface provides a means to navigate and learn more information about the program analysis tools in its toolbox. It facilitates unique interactions between reverse engineering frameworks and program analysis tools by providing a way to broker messages between the two applications. The embodiment separates the underlying platform and programming language of a program analysis tool from the reverse engineering framework itself.

Figure 1:
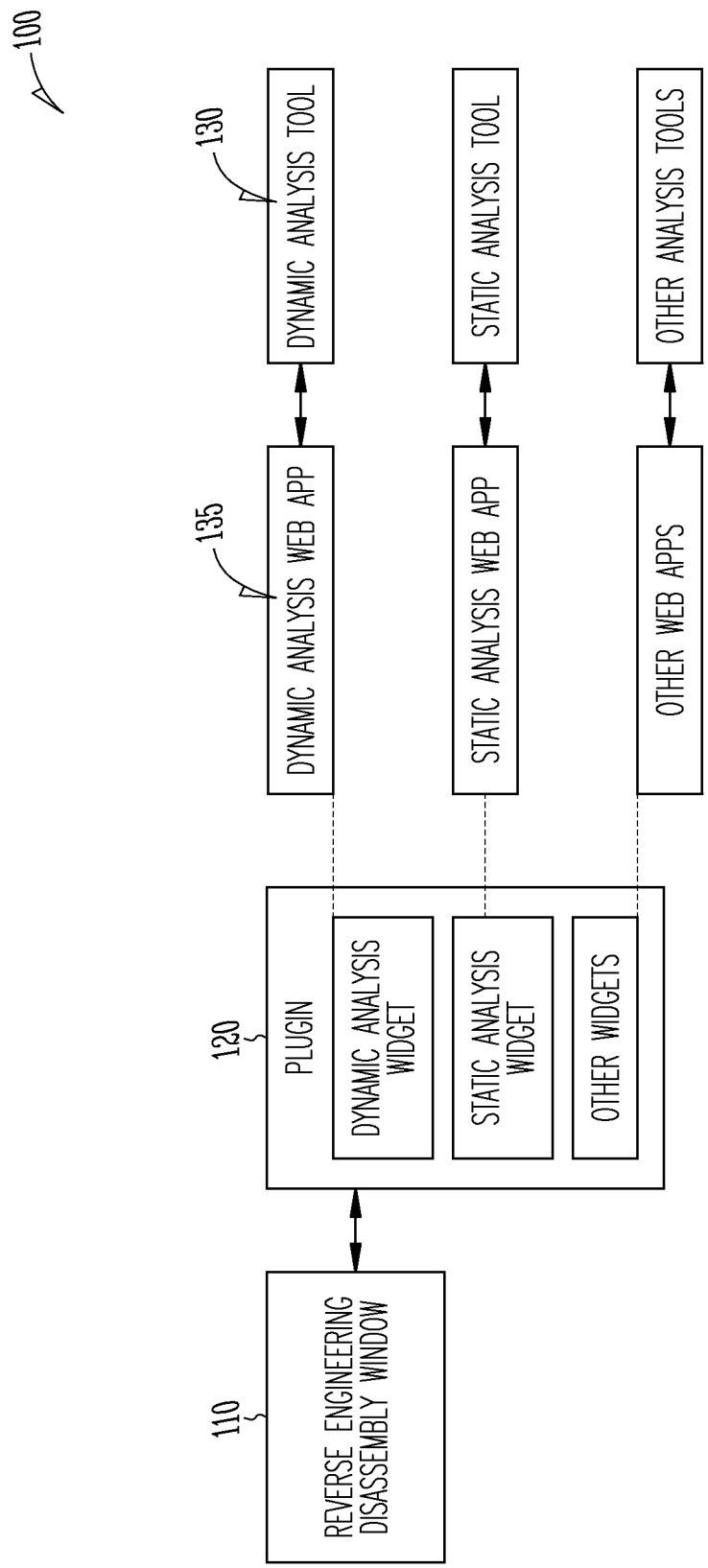
FIG. 1 is a block diagram illustrating a system for organizing the inputs and outputs of program analysis tools.

FIG. 1 is a block diagram illustrating a system 100 for organizing the inputs and outputs of program analysis tools. The system 100 includes a reverse engineering disassembly window 110, a plugin 120, and program analysis tools 130 and program analysis tool apps 135. The plugin 120 can broker requests between the program analysis tool apps 135 and the reverse engineering disassembly window 110. For example, if the program analysis tool app 135 would like to add a data structure into the reverse engineering framework, the plugin 120 invokes an application programming interface (API) to execute the addition of the data structure. The plugin 120 also provides a visualization of all the program analysis tool apps 135 that are available. This permits a user to reuse or go back to a program analysis tool app 135 that has already been invoked by the user (and further to return to the location in the program analysis tool app 135 where the app was last executing). The program analysis tool apps 135 trigger commands in the underlying tool. In an embodiment, the plugin 120 can interact directly with the underlying tool in addition to the program analysis tool app 135.

In an embodiment, the system 100 of FIG. 1 functions as follows. Once the plugin 120 is instantiated, the system 100 initializes a web application that hosts a user interface. The system 100 displays its web application using webpage rendering libraries (e.g., JavaFX Webview) that are compatible with the reverse engineering framework's native language. The system's web application iterates through a list of program analysis modules and renders their user interface components. The system 100 uses its program analysis modules to broker messages between the reverse engineering framework disassembly window 110 and the program analysis tool apps 135 and program analysis tools 130 by sending and receiving HTTP requests. The brokered messages trigger events in the reverse engineering framework (e.g., changing the focus to an address in the reverse engineering application). The system 100 organizes program analysis tools by switching between program analysis tool module state and context from the exposed web application. In short, the system closes the gap between program analysis tools and reverse engineering frameworks.

Figure 3:
FIG. 3 illustrates an example of a program analysis tool user interface in a system for aggregating program analysis tools.

In an embodiment, as illustrated in FIG. 2, the plugin can support several program analysis tools. These tools can be, for example, dynamic program analysis tools or static program analysis tools. Such tools can further be, for example, a state of the art fuzzing test harness, a multi-architecture dynamic program analysis framework, and a static analysis framework for binary executables. A program analysis tool, for example as illustrated in FIG. 3, can allow a user to select basic blocks within a binary to prioritize while fuzzing.

Additionally, the plugin provides capabilities that have not been previously available in the realm of the interaction between reverse engineering frameworks and program analysis tools. These capabilities include the ability to interact with program analysis tools not written in the native language of the reverse engineering framework disassembler, a way to quickly navigate between program analysis tools, a platform to facilitate unique interactions between the reverse engineering disassembler and the program analysis tools, and a graphical user interface and visualizations for program analysis tools.

A typical concept of operation (CONOPS) for the plugin involves a human vulnerability researcher performing vulnerability research on a target application. For example, the vulnerability researcher may be targeting an application that reads a PDF file. In this case the vulnerability researcher would load the PDF reading application into the reverse engineering disassembler and start the plugin. As the vulnerability researcher reverse engineers the application, the researcher selects program analysis tools to interact with from the plugin user interface that improve the researcher's analysis. For example, the researcher might view code coverage from a fuzzing program analysis tool and quickly jump to uncovered areas using the program analysis tool. As the researcher is analyzing a program with the plugin, the researcher may discover that a new program analysis tool has been released for the plugin that aids the researcher's analysis. The researcher can then load the new program analysis tool into the plugin and continue the reverse engineering.

The plugin accepts as input the identity of program analysis tools. The plugin permits the changing of context between different program analysis tools when a user navigates between program analysis tools from a plugin navigational panel. The plugin cleans up transitory artifacts when the user exits the plugin. The plugin renders a status dash-board window that shows loaded program tools and application status. The plugin warns a user when a program analysis tool's required dependencies have not been met and aborts installation, and the plugin prompts the user with a program tool's required dependencies if module installation has been aborted. The plugin resumes a program tool's previous state when the user navigates between program tools.

Some of the plugin's non-functional features are as follows. The plugin facilitates interactions between program analysis tools and a reverse engineering platform's disassembler and decompiler. The plugin executes in a secure computing environment. The plugin installs on a user's system as a standalone package without access to a local area network or the Internet. The plugin runs offline without access to a local area network or the Internet.

Figure 5A:
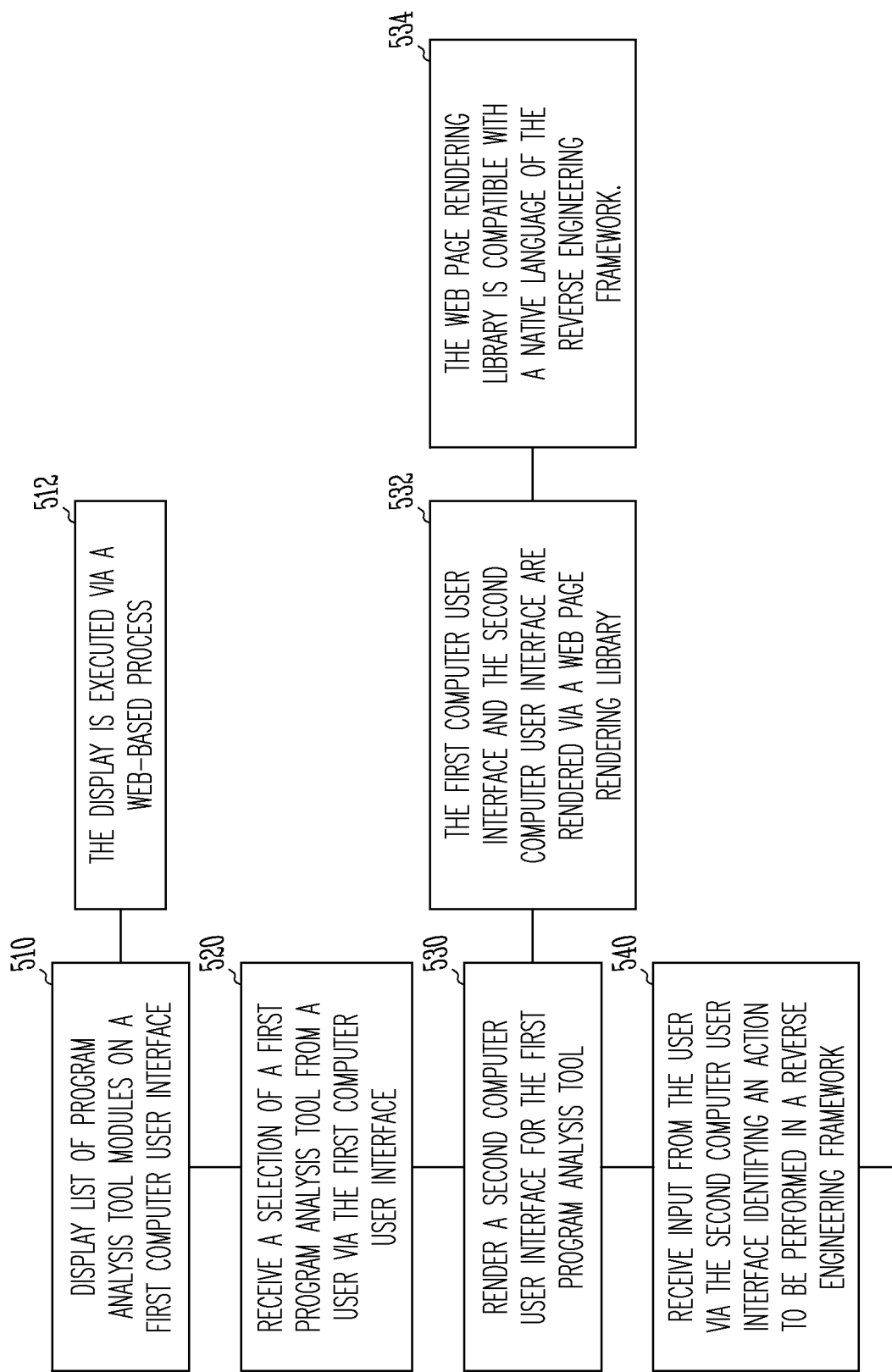

FIGS. 5A, 5B and 5C are a block diagram illustrating operations and features of a system for aggregating program analysis tools. FIGS. 5A, 5B and 5C include a number of feature and process blocks 510-574. Though arranged substantially serially in the example of FIGS. 5A, 5B and 5C, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIGS. 5A, 5B and 5C, at 510, a process displays a list of program analysis tool modules on a first computer user interface. As indicated at 512, the process is a web-based process.

At 520, a selection of a first program analysis tool is received from a user via the first computer user interface. At 530, a second computer user interface is rendered for the first program analysis tool. As indicated at 532, the first computer user interface and the second computer user interface are rendered via a web page rendering library. The web page rendering library is compatible with a native language of the reverse engineering framework (534).

At 540, input is received from the user via the second computer user interface identifying an action to be performed in a reverse engineering framework.

Figure 4:
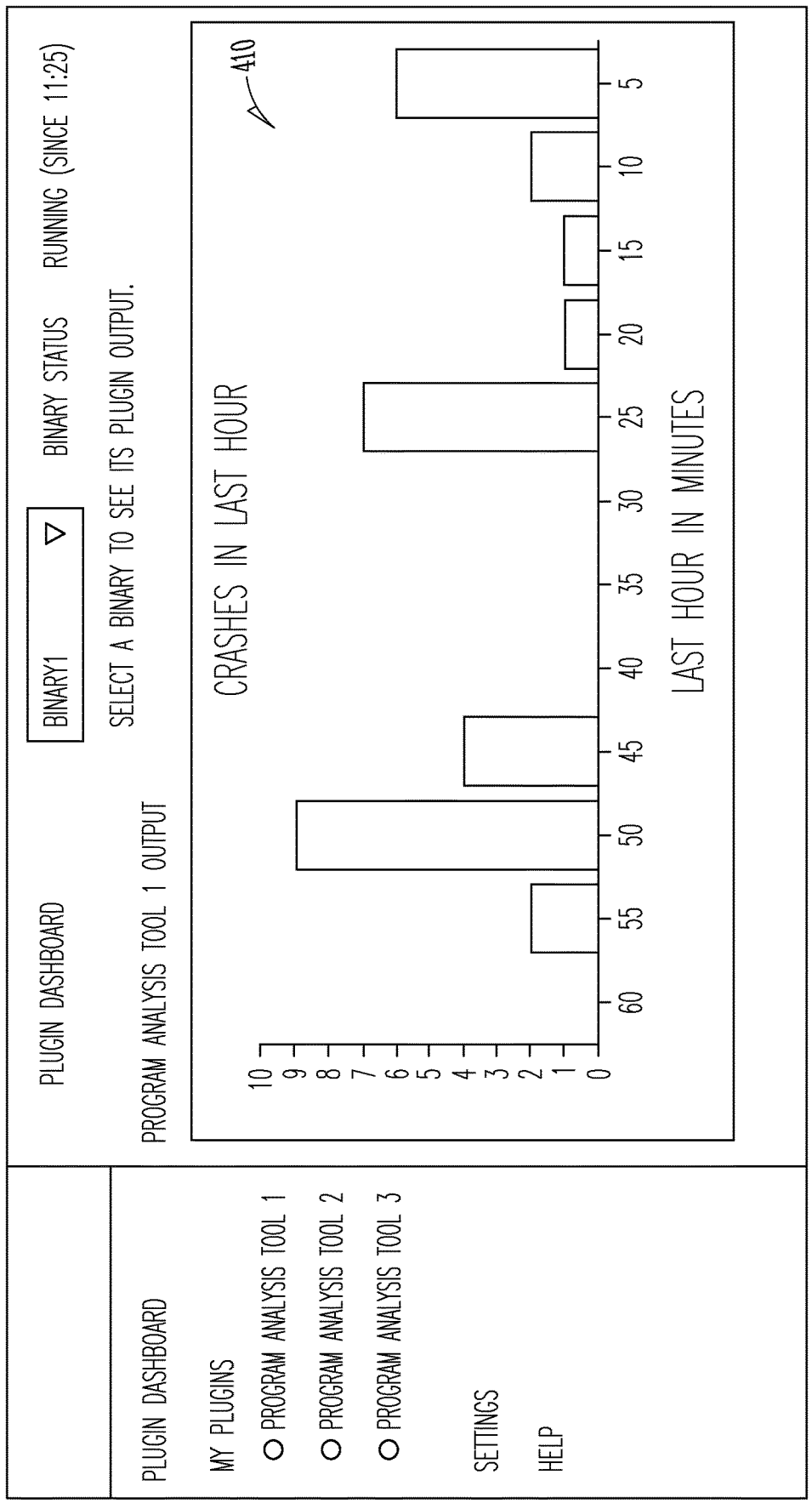
FIG. 4 illustrates an example of another program analysis tool user interface in a system for aggregating program analysis tools.

At 550, the input is transmitted via a message to the reverse engineering framework. The message is transmitted via sent and received HTTP requests (552). As indicated at 554, the message triggers events in the reverse engineering framework. The triggered events include one or more of an addition of a user-entered data structure into the reverse engineering framework, an identification of an address in the reverse engineering framework, a selection of a block of code of an object in the reverse engineering framework, and a selection of a block of memory of the object in the reverse engineering framework (554A). FIG. 4 illustrates an example of a program analysis tool user interface that indicates data from a dynamic program analysis tool. Specifically, the output user interface reports on the number of crashes of a program within a particular time period in the form of a bar graph 410.

As indicated at 560, in an embodiment, the process renders a plurality of computer user interfaces for a plurality of program analysis tools. This permits the user to navigate among the plurality of computer user interfaces at 562, and permits the user at 564 to transmit messages between the plurality of program analysis tools and the reverse engineering framework. As noted at 566, these program analysis tools can include a dynamic program analysis tool (e.g., a fuzzing test tool) and a static program analysis tool. As indicated at 568, a user can move from using a first program analysis tool to using a second program analysis tool, and return to the first program analysis tool and resume a prior state of the first program analysis tool when the user returns to the first program analysis tool.

In another embodiment, a user can add a new program analysis tool (570). However, if one or more dependencies do not exist for the new program analysis tool, the user is informed of this situation via a message displayed on the first computer user interface (572). Then, at 574, the installation of the new program analysis tool is aborted.

Figure 6:
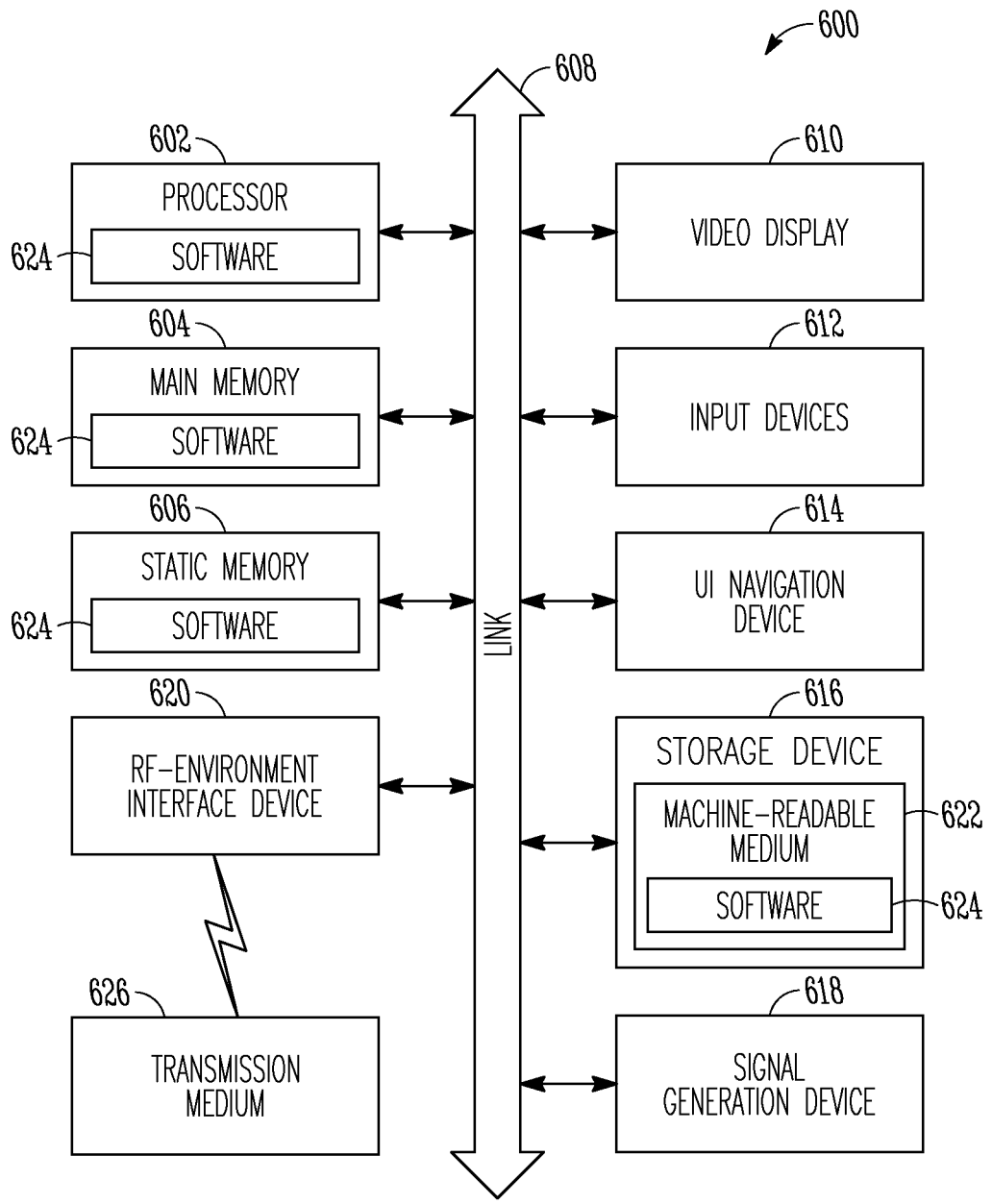
FIG. 6 illustrates an embodiment of a computer architecture upon which one or more embodiments of the present disclosure can execute.

FIG. 6 is a block diagram illustrating a computing and communications platform 600 in the example form of a general-purpose machine on which some or all the operations of FIGS. 5A, 5B and 5C may be carried out according to various embodiments. In certain embodiments, programming of the computing platform 600 according to one or more particular algorithms produces a special-purpose machine upon execution of that programming. In a networked deployment, the computing platform 600 may operate in the capacity of either a server or a client machine in server-client network environments, or it may act as a peer machine in peer-to-peer (or distributed) network environments.

Example computing platform 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computing platform 600 may further include a video display unit 610, input devices 612 (e.g., a keyboard, camera, microphone), and a user interface (UI) navigation device 614 (e.g., mouse, touchscreen). The computing platform 600 may additionally include a storage device 616 (e.g., a drive unit), a signal generation device 618 (e.g., a speaker), and a RF-environment interface device 5 (RFEID) 620.

The storage device 616 includes a non-transitory machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computing platform 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

RFEID 620 includes radio receiver circuitry, along with analog-to-digital conversion circuitry, and interface circuitry to communicate via link 608 according to various embodiments. Various form factors are contemplated for RFEID 620. For instance, RFEID may be in the form of a wideband radio receiver, or scanning radio receiver, that interfaces with processor 602 via link 608. In one example, link 608 includes a PCI Express (PCIe) bus, including a slot into which the NIC form-factor may removably engage. In another embodiment, RFEID 620 includes circuitry laid out on a motherboard together with local link circuitry, processor interface circuitry, other input/output circuitry, memory circuitry, storage device and peripheral controller circuitry, and the like. In another embodiment, RFEID 620 is a peripheral that interfaces with link 608 via a peripheral input/output port such as a universal serial bus (USB) port. RFEID 620 receives RF emissions over wireless transmission medium 626. RFEID 620 may be constructed to receive RADAR signaling, radio communications signaling, unintentional emissions, or some combination of such emissions.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

EXAMPLES

Example No. 1 is a process comprising displaying a list of program analysis tool modules on a first computer user interface; receiving from a user via the first computer user interface a selection of a first program analysis tool; rendering a second computer user interface for the first program analysis tool; receiving input from the user via the second computer user interface identifying an action to be performed in a reverse engineering framework; and transmitting the input via a message to the reverse engineering framework.

Example No. 2 includes all the features of Example No. 1, and optionally includes a process wherein the process comprises a web-based process.

Example No. 3 includes all the features of Example Nos. 1-2, and optionally includes a process wherein the first computer user interface and the second computer user interface are rendered via a web page rendering library; and wherein the web page rendering library is compatible with a native language of the reverse engineering framework.

Example No. 4 includes all the features of Example Nos. 1-3, and optionally includes a process wherein the message is transmitted via sent and received HTTP requests.

Example No. 5 includes all the features of Example Nos. 1-4, and optionally includes a process wherein the message triggers events in the reverse engineering framework; and wherein the triggered events comprise one or more of an addition of a user-entered data structure into the reverse engineering framework, an identification of an address in the reverse engineering framework, a selection of a block of code of an object in the reverse engineering framework, and a selection of a block of memory of the object in the reverse engineering framework.

Example No. 6 includes all the features of Example Nos. 1-5, and optionally includes a process comprising rendering a plurality of computer user interfaces for a plurality of program analysis tools; permitting the user to navigate among the plurality of computer user interfaces; and transmitting messages between the plurality of program analysis tools and the reverse engineering framework.

Example No. 7 includes all the features of Example Nos. 1-6, and optionally includes a process wherein the program analysis tools comprise one or more of a dynamic program analysis tool (e.g., a fuzzing test tool) and a static program analysis tool.

Example No. 8 includes all the features of Example Nos. 1-7, and optionally includes a process comprising receiving input from the user to add a new program analysis tool; displaying on the first computer user interface a message indicating that one or more dependencies do not exist for the new program analysis tool; and aborting installation of the new program analysis tool.

Example No. 9 includes all the features of Example Nos. 1-8, and optionally includes a process comprising permitting a user to move from using the first program analysis tool to using a second program analysis tool, and returning to the first program analysis tool and resuming a prior state of the first program analysis tool when the user returns to the first program analysis tool.

Example No. 10 is a non-transitory machine-readable medium comprising instructions that when executed by a processor executes a process comprising displaying a list of program analysis tool modules on a first computer user interface; receiving from a user via the first computer user interface a selection of a first program analysis tool; rendering a second computer user interface for the first program analysis tool; receiving input from the user via the second computer user interface identifying an action to be performed in a reverse engineering framework; and transmitting the input via a message to the reverse engineering framework.

Example No. 11 includes all the features of Example No. 10, and optionally includes a non-transitory computer-readable medium wherein the process comprises a web-based process.

Example No. 12 includes all the features of Example Nos. 10-11, and optionally includes a non-transitory computer-readable medium wherein the first computer user interface and the second computer user interface are rendered via a web page rendering library; and wherein the web page rendering library is compatible with a native language of the reverse engineering framework.

Example No. 13 includes all the features of Example Nos. 10-12, and optionally includes a non-transitory computer-readable medium wherein the message is transmitted via sent and received HTTP requests.

Example No. 14 includes all the features of Example Nos. 10-13, and optionally includes a non-transitory computer-readable medium wherein the message triggers events in the reverse engineering framework; and wherein the triggered events comprise one or more of an addition of a user-entered data structure into the reverse engineering framework, an identification of an address in the reverse engineering framework, a selection of a block of code of an object in the reverse engineering framework, and a selection of a block of memory of the object in the reverse engineering framework.

Example No. 15 includes all the features of Example Nos. 10-14, and optionally includes a non-transitory computer-readable medium comprising instructions for rendering a plurality of computer user interfaces for a plurality of program analysis tools; permitting the user to navigate among the plurality of computer user interfaces; and transmitting messages between the plurality of program analysis tools and the reverse engineering framework.

Example No. 16 includes all the features of Example Nos. 10-15, and optionally includes a non-transitory computer-readable medium wherein the program analysis tools comprise one or more of a dynamic program analysis tool and a static program analysis tool.

Example No. 17 includes all the features of Example Nos. 10-16, and optionally includes a non-transitory computer-readable medium comprising instructions for receiving input from the user to add a new program analysis tool; displaying on the first computer user interface a message indicating that one or more dependencies do not exist for the new program analysis tool; and aborting installation of the new program analysis tool.

Example No. 18 includes all the features of Example Nos. 10-17, and optionally includes a non-transitory computer-readable medium comprising instructions for permitting a user to move from using the first program analysis tool to using a second program analysis tool, and returning to the first program analysis tool and resuming a prior state of the first program analysis tool when the user returns to the first program analysis tool.

Example No. 19 is a system comprising a computer processor; and a computer memory coupled to the computer processor; wherein the computer processor and the computer memory are operable for displaying a list of program analysis tool modules on a first computer user interface; receiving from a user via the first computer user interface a selection of a first program analysis tool; rendering a second computer user interface for the first program analysis tool; receiving input from the user via the second computer user interface identifying an action to be performed in a reverse engineering framework; and transmitting the input via a message to the reverse engineering framework.

Example No. 20 includes all the features of Example No. 19, and optionally includes a computer processor and a computer memory that are operable for permitting a user to move from using the first program analysis tool to using a second program analysis tool, and returning to the first program analysis tool and resuming a prior state of the first program analysis tool when the user returns to the first program analysis tool.

The invention claimed is:

1. A process comprising:
   displaying a list of program analysis tool modules on a first computer user interface, wherein at least one of the program analysis tool modules is a standalone analysis tool;
   receiving from a user via the first computer user interface a selection of a first program analysis tool from the list of program analysis tool modules;
   rendering a second computer user interface for the first program analysis tool;
   receiving input from the user via the second computer user interface identifying an action to be performed in a reverse engineering framework that disassembles a compiled binary code for analysis; and
   transmitting the input via a message to the reverse engineering framework,
   wherein the second computer user interface is compatible with a native language of the reverse engineering framework and said at least one standalone analysis tool displayed on the first user interface.

2. The process of claim 1, wherein the process comprises a web-based process.

3. The process of claim 2, wherein the first computer user interface and the second computer user interface are rendered via a web page rendering library; and wherein the web page rendering library is compatible with a native language of the reverse engineering framework.

4. The process of claim 1, wherein the message is transmitted via sent and received HTTP requests.

5. The process of claim 1, wherein the message triggers events in the reverse engineering framework; and wherein the triggered events comprise one or more of an addition of a user-entered data structure into the reverse engineering framework, an identification of an address in the reverse engineering framework, a selection of a block of code of an object in the reverse engineering framework, and a selection of a block of memory of the object in the reverse engineering framework.

6. The process of claim 1, comprising rendering a plurality of computer user interfaces for a plurality of program analysis tools, permitting the user to navigate among the plurality of computer user interfaces; and transmitting messages between the plurality of program analysis tools and the reverse engineering framework.

7. The process of claim 6, wherein the program analysis tools comprise one or more of a dynamic program analysis tool, comprising (a fuzzing test tool and a static program analysis tool.

8. The process of claim 1, comprising receiving input from the user to add a new program analysis tool; displaying on the first computer user interface a message indicating that one or more dependencies do not exist for the new program analysis tool; and aborting installation of the new program analysis tool.

9. The process of claim 1, comprising permitting a user to move from using the first program analysis tool to using a second program analysis tool, and returning to the first program analysis tool and resuming a prior state of the first program analysis tool when the user returns to the first program analysis tool.

10. A non-transitory machine-readable medium comprising instructions that when executed by a processor executes a process comprising:
    displaying a list of program analysis tool modules on a first computer user interface, wherein at least one of the program analysis tool modules is a standalone analysis tool;
    receiving from a user via the first computer user interface a selection of a first program analysis tool from the list of program analysis tool modules;
    rendering a second computer user interface for the first program analysis tool;
    receiving input from the user via the second computer user interface identifying an action to be performed in a reverse engineering framework that disassembles a compiled binary code for analysis; and
    transmitting the input via a message to the reverse engineering framework,
    wherein the second computer user interface is compatible with a native language of the reverse engineering framework and said at least one standalone analysis tool displayed on the first user interface.

11. The non-transitory machine-readable medium of claim 10, wherein the process comprises a web-based process.

12. The non-transitory machine-readable medium of claim 11, wherein the first computer user interface and the second computer user interface are rendered via a web page rendering library; and wherein the web page rendering library is compatible with a native language of the reverse engineering framework.

13. The non-transitory machine-readable medium process of claim 10, wherein the message is transmitted via sent and received HTTP requests.

14. The non-transitory machine-readable medium of claim 10, wherein the message triggers events in the reverse engineering framework; and wherein the triggered events comprise one or more of an addition of a user-entered data structure into the reverse engineering framework, an identification of an address in the reverse engineering framework, a selection of a block of code of an object in the reverse engineering framework, and a selection of a block of memory of the object in the reverse engineering framework.

15. The non-transitory machine-readable medium of claim 10, comprising instructions for rendering a plurality of computer user interfaces for a plurality of program analysis tools; permitting the user to navigate among the plurality of computer user interfaces; and transmitting messages between the plurality of program analysis tools and the reverse engineering framework.

16. The non-transitory machine-readable medium of claim 15, wherein the program analysis tools comprise one or more of a dynamic program analysis tool and a static program analysis tool.

17. The non-transitory machine-readable medium of claim 10, comprising instructions for receiving input from the user to add a new program analysis tool; displaying on the first computer user interface a message indicating that one or more dependencies do not exist for the new program analysis tool; and aborting installation of the new program analysis tool.

18. The non-transitory machine-readable medium of claim 10, comprising instructions for permitting a user to move from using the first program analysis tool to using a second program analysis tool, and returning to the first program analysis tool and resuming a prior state of the first program analysis tool when the user returns to the first program analysis tool.

19. A system comprising:
    a computer processor; and a computer memory coupled to the computer processor;

wherein the computer processor and the computer memory are operable for:

displaying a list of program analysis tool modules on a first computer user interface, wherein at least one of the program analysis tool modules is a standalone analysis tool;

receiving from a user via the first computer user interface a selection of a first program analysis tool;

receiving from a user via the first computer user interface a selection of a first program analysis tool from the list of program analysis tool modules;

rendering a second computer user interface for the first program analysis tool;

receiving input from the user via the second computer user interface identifying an action to be performed in a reverse engineering framework;

receiving input from the user via the second computer user interface identifying an action to be performed in a reverse engineering framework that disassembles a compiled binary code for analysis; and transmitting the input via a message to the reverse engineering framework, wherein the second computer user interface is compatible with a native language of the reverse engineering framework and said at least one standalone analysis tool displayed on the first user interface.

20. The system of claim 19, wherein the computer processor and the computer memory are operable for permitting a user to move from using the first program analysis tool to using a second program analysis tool, and returning to the first program analysis tool and resuming a prior state of the first program analysis tool when the user returns to the first program analysis tool.

* * * * *